United States Patent [19]

Sakamoto et al.

[11] Patent Number: 5,682,253
[45] Date of Patent: Oct. 28, 1997

[54] DOT PRINTER WITH RECORDING HEAD AND SCANNER MOUNTED ON SAME CARRIAGE AND OPERATION CONTROLLED BASED ON MARKER IDENTIFICATION ON MANUSCRIPT

[75] Inventors: Masaki Sakamoto; Hideki Naitou; Hideki Yorozu, all of Iwate-ken, Japan

[73] Assignee: Alps Electric Co., Ltd., Tokyo, Japan

[21] Appl. No.: 650,722

[22] Filed: May 20, 1996

[30] Foreign Application Priority Data

Jun. 30, 1995 [JP] Japan ................. 7-166254

[51] Int. Cl.⁶ ..................... H04N 1/024; H04N 1/23
[52] U.S. Cl. ............. 358/468; 358/472; 358/296
[58] Field of Search ................. 358/472, 468, 358/474, 494, 296; 382/317; 235/375, 436

[56] References Cited

U.S. PATENT DOCUMENTS

| | | | |
|---|---|---|---|
| 3,885,229 | 5/1975 | Negita et al. | 382/317 |
| 4,589,143 | 5/1986 | Baur et al. | 382/317 |
| 4,589,144 | 5/1986 | Namba | 382/317 |
| 4,635,130 | 1/1987 | Oi | 358/296 |
| 4,686,704 | 8/1987 | Kamada et al. | 382/317 |
| 4,809,080 | 2/1989 | Kotani et al. | 358/472 |
| 5,105,279 | 4/1992 | Kamada et al. | 358/296 |
| 5,570,205 | 10/1996 | Sugita et al. | 358/472 |

*Primary Examiner*—Scott A. Rogers
*Attorney, Agent, or Firm*—Guy W. Shoup; Patrick T. Bever

[57] ABSTRACT

This invention provides a dot printer which reads a manuscript and prints on a recording medium automatically only by placing a manuscript and a recording medium. A thermal head and an image scanner are provided facing to a platen, a feeding mechanism for feeding a desired manuscript or recording medium between the platen, and the thermal head and the image scanner is provided, an identification marker is formed on the upstream side of feeding of the manuscript, and a controller for controlling the operation is provided so that the identification marker is read using the image scanner to recognize that the medium is a manuscript fed from the feeding mechanism, then, the image scanner starts to read the manuscript.

3 Claims, 4 Drawing Sheets

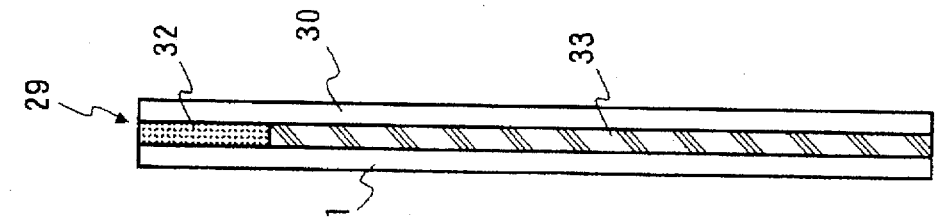
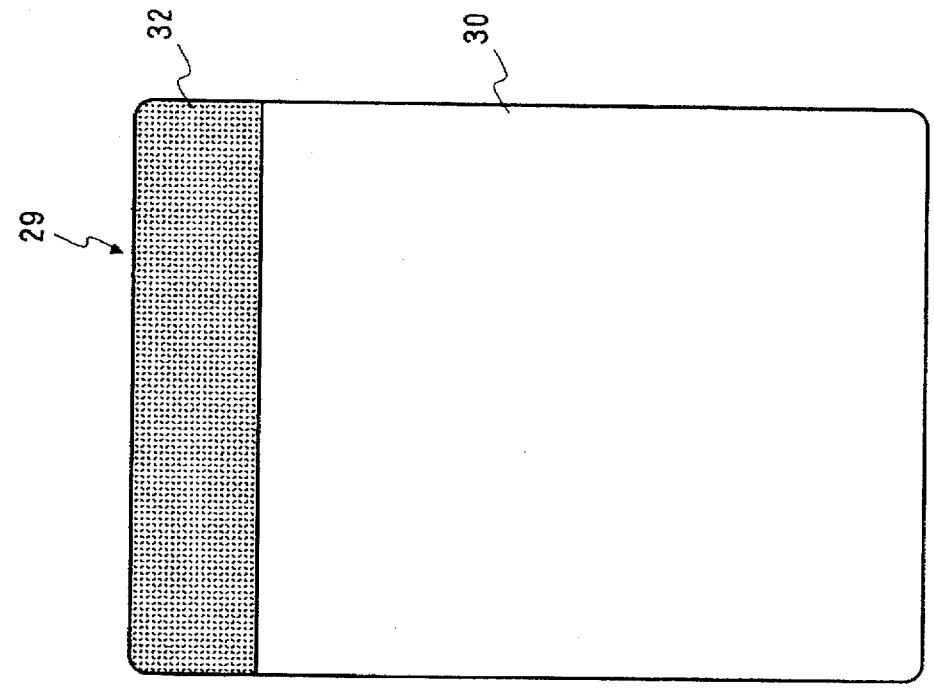
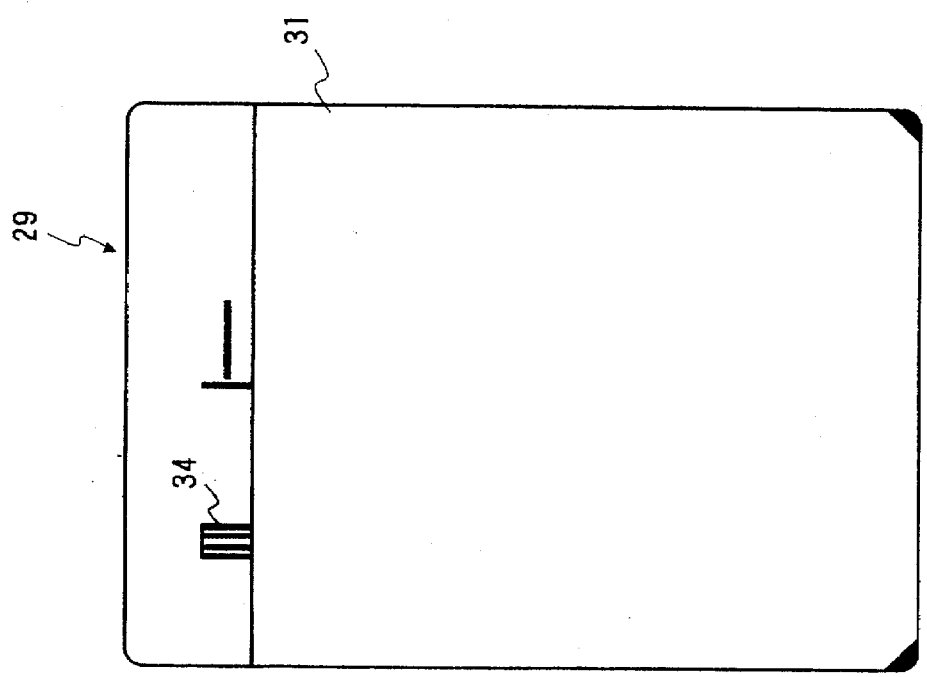

DOT PRINTER WITH RECORDING HEAD AND SCANNER MOUNTED ON SAME CARRIAGE AND OPERATION CONTROLLED BASED ON MARKER IDENTIFICATION ON MANUSCRIPT

BACKGROUND OF THE INVENTION

1. Field of the Invention

This invention relates to a dot printer, and particularly relates to a dot printer provided with an image scanner as an image reading means.

2. Description of the Related Art

Conventionally various dot printers have been used, in which a prescribed recording medium is pressed between a carrier roller and a pressure roller forced rotatably against the carrier roller, the recording medium is fed between a platen and a recording head by rotating the carrier roller, and the recording head is operated selectively to imprint ink on the recording medium for recording desirably while a carriage having the recording head thereon is traveling along the platen.

Recently, a dot printer is proposed, in which an image scanner is mounted on such a printer in addition to the recording head, a manuscript is fed by the carrier roller and the pressure roller between the platen and the image scanner, the image information on the manuscript is read by scanning the image scanner while the carriage having the image scanner thereon is traveling along the platen, and the recording head is operated to record on the prescribed recording medium based on the read data.

When such a dot printer is used, an operator sets a manuscript or recording medium and sets a selection switch to the manuscript position or to the recording medium position, and depending on the setting operation, if the switch is set to a manuscript, the image scanner is scanned to operate reading, on the other hand, if the switch is set to a recording medium, the recording head is operated to print.

However, when an operator uses a dot printer as described herein above, it is required for the operator to set successively the selection if the medium is a manuscript or a recording medium, the successive setting is a complex operation inconveniently, this is disadvantageous. In addition, it is an inconvenient problem that when the operator sets the selection switch erroneously, a white recording medium is read or, on the contrary, a manuscript is printed.

SUMMARY OF THE INVENTION

It is an object of the present invention to provide a dot printer which operates automatically a reading operation of a manuscript and a printing operation on a recording medium only by placing a manuscript or a recording medium.

It is another object of the present invention to provide a dot printer provided with: a recording head and an image scanner positioned facing to a platen; a feeding mechanism for feeding a desired manuscript or recording medium between the platen, and the recording head and the image scanner; and a selecting means for selecting if the medium fed from the inlet is a manuscript or a recording medium, for operating the image scanner to read a manuscript image, and for operating the recording head to record on the recording medium based on the read image information, wherein an identification marker is formed on the manuscript at the upstream side of the feeding, and a controller for controlling the operation is provided so that; when the manuscript is selected by the selecting means, the image scanner is activated to read the manuscript after the image scanner reads the identification marker to confirm that the medium fed from the feeding mechanism is a manuscript.

It is a further object of the present invention to provide a dot printer in which the image scanner reads the marker on the selected medium, and when the image scanner can not find the prescribed marker, the controller exercises an error processing.

According to the present invention, the image scanner reads the identification marker after the feeding operation, and when the image scanner finds the identification marker, the image scanner judges that the medium is a manuscript and the image scanner is scanned to read the manuscript, on the other hand, when the image scanner does not find the identification marker, an error processing is exercised. Thereby, if an operator sets erroneously the selection switch to the manuscript, the image scanner does not erroneously read the white recording medium, on the other hand, if an operator sets correctly the selection switch to the recording medium, only when the identification marker can not be found, the controller judges that the medium is a recording medium, and the recording head is operated to print, thus, if an operator sets erroneously the selection switch, the dot printer exercises correctly reading of a manuscript or printing on a recording medium.

BRIEF DESCRIPTION OF THE DRAWINGS

FIG. 6 is a plan view for illustrating a holder cover of a manuscript holder used for a dot printer of the present invention;

FIG. 7 is a plan view for illustrating a holder base of the manuscript holder used for the dot printer of the present invention; and FIG. 8 is a side view of the manuscript holder used for the dot printer of the present invention.

DESCRIPTION OF THE PREFERRED EMBODIMENTS

Figure 1:
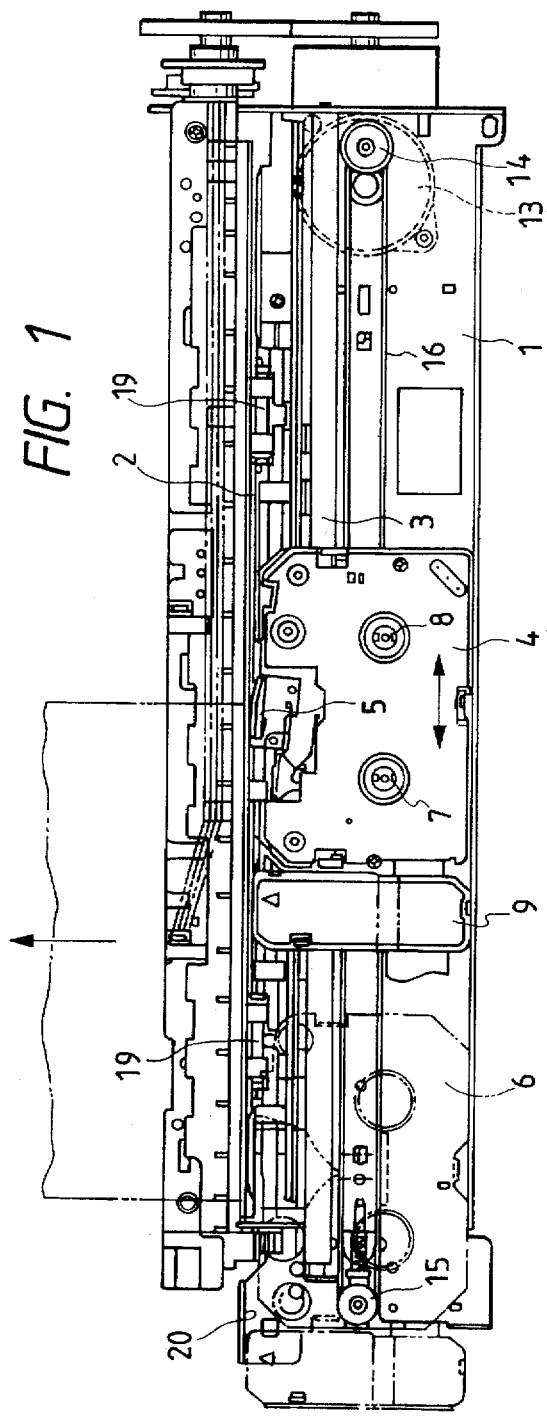
FIG. 1 is a plan view of the related structure of a thermal transfer printer of one embodiment of a dot printer in accordance with the present invention.

Embodiments of the present invention will be described in detail referring to FIG. 1 to FIG. 8.

FIG. 1 to FIG. 4 show one embodiment of a thermal transfer printer used as a dot printer in accordance with the present invention. A frame 1 of the printer is provided with a flat plate like platen 2 extending along its longitudinal direction, and a carriage shaft 3 extending in parallel with the platen 2 is supported in front of the platen 2 between both sides of the frame 1. On the carriage shaft 3, a carriage 4 is mounted reciprocatively movably along the carriage shaft 3, and at the end of the carriage 4, a thermal head 5 used as a recording head is mounted facing to the platen 2 for on-off contact operation. The top side of the carriage 4 is structured so that a ribbon cassette 6 for containing an ink ribbon not shown in the figure and for guiding the ink ribbon between the thermal head 5 and the platen 2 is attached detachably thereon, and on the top side of the carriage 4, a winding up bobbin 7 for winding up the ink ribbon in the ribbon cassette 6 and a feeding bobbin 8 for feeding the ink ribbon are provided.

Figure 2:
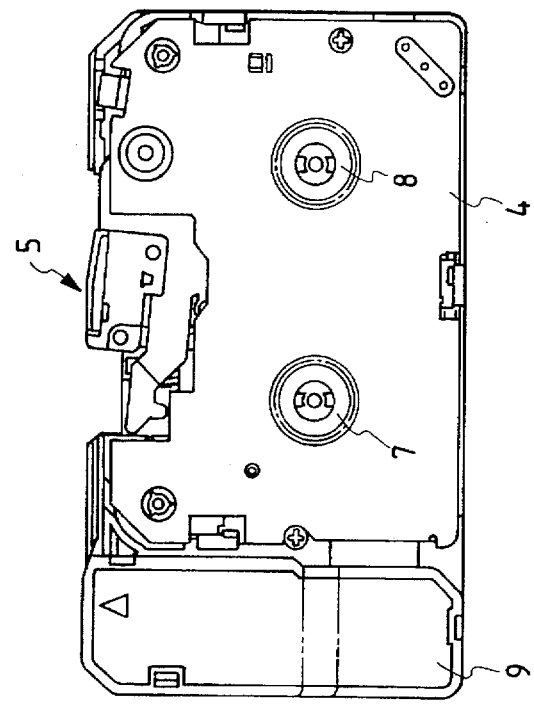
FIG. 2 is a plan view for illustrating the structure of a carriage of the thermal transfer printer shown in FIG. 1.
Figure 3:
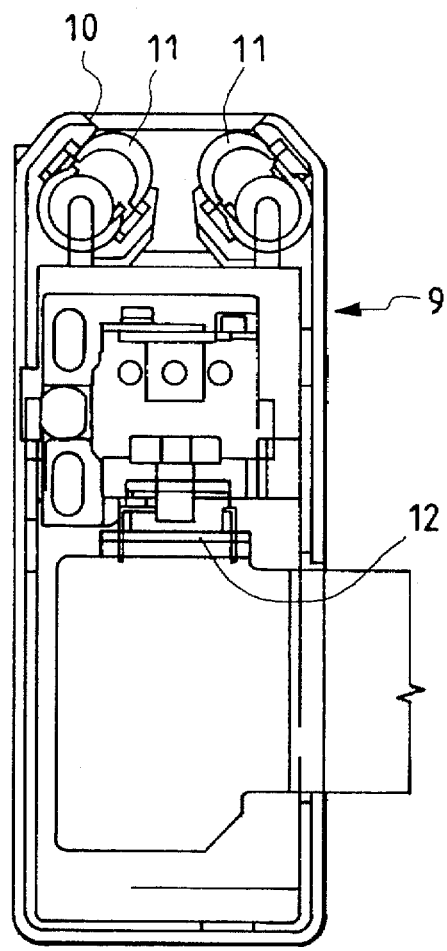
FIG. 3 is a plan view for illustrating the structure of an image scanner of the thermal transfer printer shown in FIG. 1.
Figure 4:
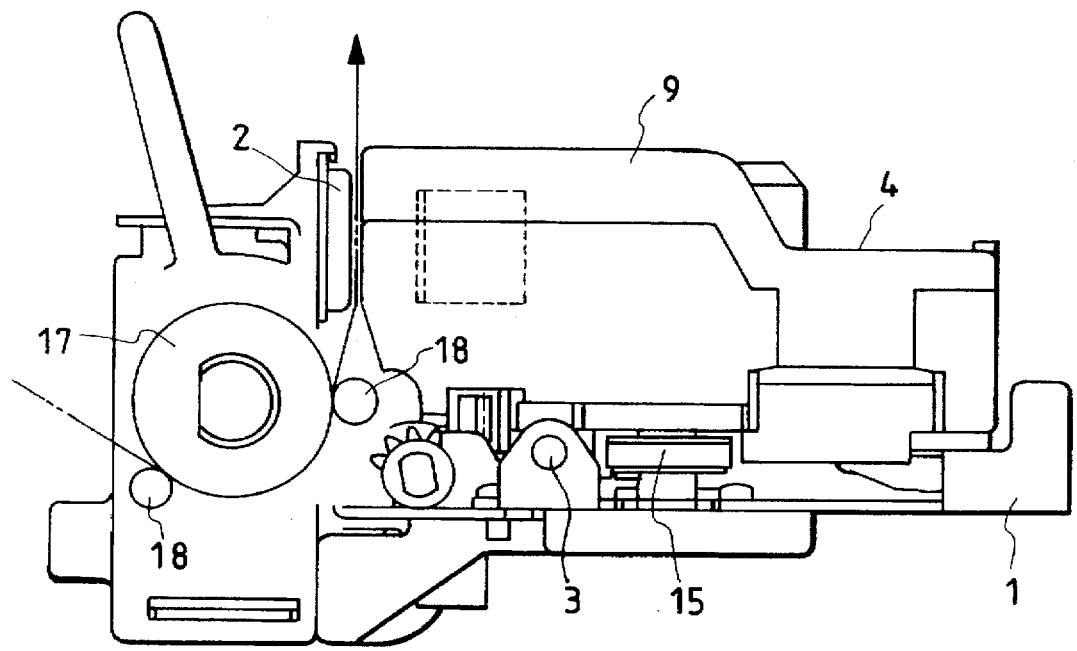
FIG. 4 is a side view of the related structure of the thermal transfer printer shown in FIG. 1.

In this embodiment, as shown in FIG. 2, an image scanner 9 is provided on one side of the carriage 4, and as shown in FIG. 3, an opening 10 is provided on the side of the image scanner 9 facing to the platen 2. On both sides of the opening 10 and inside the image scanner 9, two luminous elements 11 such as a lump are provided in the direction of the opening 10, and in the internal of the image scanner 9, an image sensor unit 12 for receiving the reflected light which is emitted from the luminous elements 11 to a manuscript and reflected on the surface of the manuscript to read a desired image is provided.

On the bottom at one end of the frame 1, a carriage drive motor 13 is provided so that the output shaft thereof passes through to the top side of the frame 1, and on the output shaft of the carriage drive motor 13 a driving pulley 14 rotatably driven by the carriage drive motor 13 is provided. At the other end on the top side of the frame 1, a driven pulley 15 is provided rotatably, and a carriage driving belt 16, a part of which is connected to the bottom side of the carriage 4, is connected between the driving pulley 14 and the driven pulley 15. The carriage drive motor 13 is driven rotatably to drive the carriage driving belt 16 through the driving pulley 14, thereby, the carriage 4 is traveled reciprocatively in parallel with the platen 2 along the carriage shaft 3.

At the behind bottom of the platen 2, a carrier roller 17 for feeding a prescribed recording medium at a certain speed is provided, and under the carrier roller 17, a plurality of pressure rollers 18 forced against the carrier roller 17 are provided rotatably. Behind the frame 1, a paper feeding unit not shown in the figure is provided, and in the paper feeding unit, manuscript holders holding prescribed manuscripts or usual recording mediums such as printing paper and mimeographing paper are contained. The carrier roller 17 is driven rotatably by a feeding motor not shown in the figure to feed a manuscript holder or recording medium, which is fed between the carrier roller 17 and the pressure rollers 18 from the paper feeding unit, between the thermal head 5 and the platen 2. Above the platen 2, paper discharging rollers 19 for guiding a printed recording medium are provided.

On one side of the platen 2 of the frame 1, a positioning marker 20 is formed, and the image scanner 9 reads the positioning marker 20, thereby, the stopping position of the carriage 4 is recognized.

Figure 5:
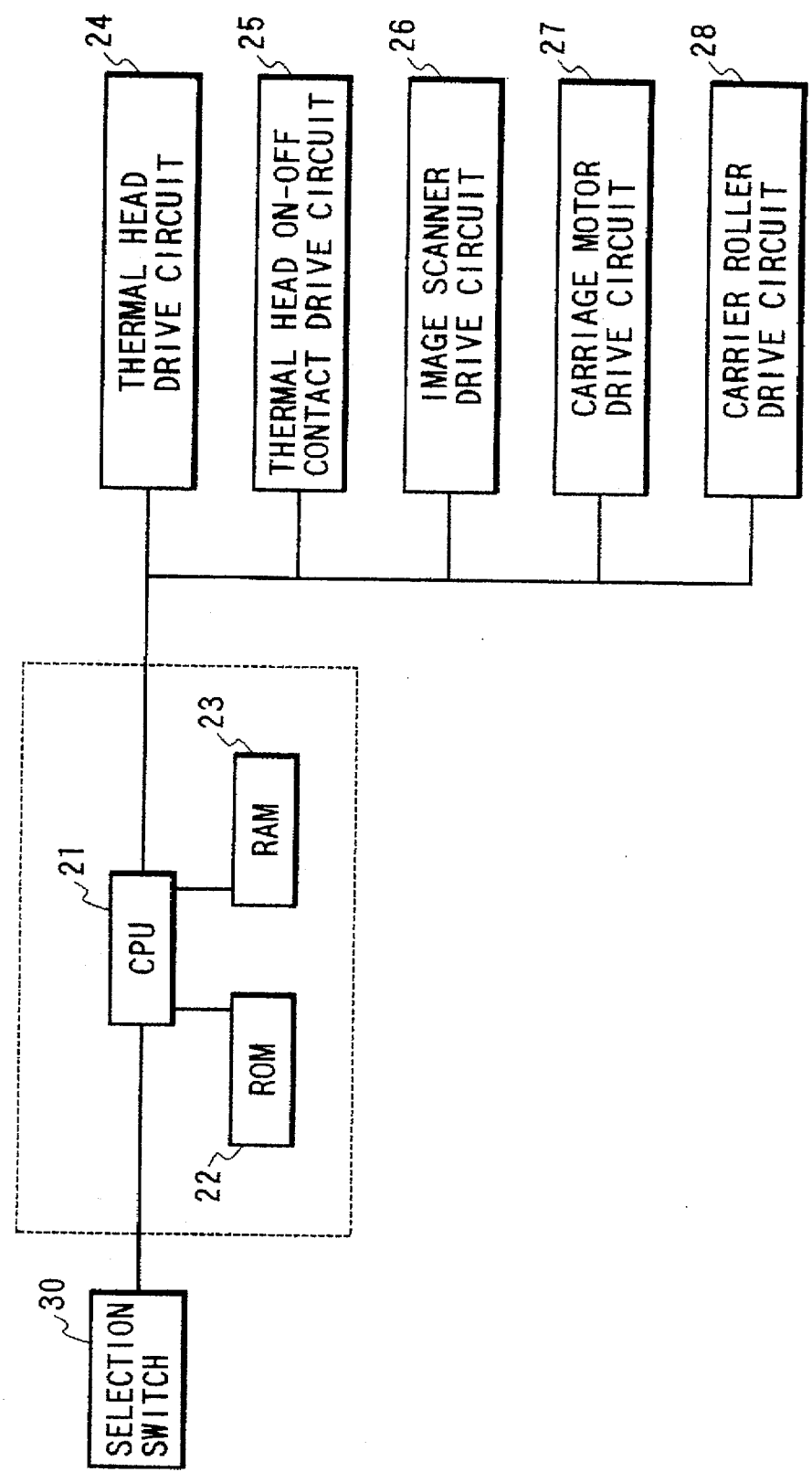
FIG. 5 is a block diagram for illustrating one embodiment of a controller of the thermal transfer printer in accordance with the present invention.

FIG. 5 shows one example of a controller of the thermal transfer printer in accordance with this embodiment. ROM 22 in which printing conditions for each type of recording medium used are stored and RAM 23 for storing various data are connected to CPU 21. Image information read by the image scanner 9 is delivered to the CPU 21, and from the CPU 21, control signals are delivered to a thermal head drive circuit 24 for controlling the current to the thermal head 5, a thermal head on-off contact drive circuit 26 for on-off contact operation of the thermal head 5 onto the platen 2, an image scanner drive circuit 26 for driving-controlling of the image scanner 9, a carriage drive motor drive circuit 27, and a carrier roller drive circuit 28. 30 is a selection switch, and the operator uses the switch to select a manuscript or a recording medium.

FIG. 6 to FIG. 8 show an example of a manuscript holder 29 used for the thermal transfer printer in accordance with the present invention. The manuscript holder 29 is provided with a flat holder base 30. On one side of the holder base 30, a holder cover 31 of a transparent material is formed solidly by adhering them at the top end with adhesive 32. In this embodiment, between the holder base 30 and the holder cover 31, a weak adhesive area 33 for providing weak adhesion between the holder base 30 and the holder cover 31 is formed. By forcing the holder cover 31 upward against the adhesion of the weak adhesive area 33, the holder cover 31 is opened from the holder base 30, and a prescribed manuscript is held between the holder base 30 and the holder cover 31. In this embodiment, a bar code-like identification marker 34 for identifying the medium to be recognized as a manuscript holder 29 is formed at the top end of the manuscript holder 29. The identification marker 34 is read by the image scanner 9.

Next, the operation of the embodiment is described.

First, in the condition that the holder cover 31 is forced to pulled up against the adhesion of the weak adhesion area 33, a prescribed manuscript is placed on the holder cover 31, and then, the holder cover 31 is closed, thereby, the manuscript is held between the holder base 30 and the holder cover 31. In this embodiment, the manuscript is held firmly between the holder base 30 and the holder cover 31 and also the holder base 30 and the holder cover 31 are stuck together because of the adhesion of the weak adhesive area 33 which is formed between the holder base 30 and the holder cover 31.

For reading the manuscript held on the manuscript holder 29 and for printing on a recording medium by the thermal transfer printer, first, the manuscript holder 29 which holds the manuscript is placed in a paper feeding unit not shown in the figure.

Then, the manuscript position is selected on the selection switch 30, and by driving rotatably the carrier roller 17 responding to an input of a control signal from the CPU 21, the manuscript holder 29, which is fed between the carrier roller 17 and the pressure rollers 18 from the paper feeding unit, is fed between the thermal head 5 and the platen 2. In this embodiment, the weak adhesion area prevents the holder base 30 and the holder cover 31 from slipping and the manuscript is consistently fed without trouble.

When the manuscript holder 29 is fed, the image scanner 9 is driven to read the identification marker 34 on the manuscript holder 29, and when the identification marker 34 is recognized, the controller recognizes that the manuscript holder 29 is fed correctly, and then reading operation of the manuscript is started. When the identification marker 34 is not recognized, the controller judges that the manuscript holder 29 is fed incorrectly, then the CPU 21 exercises an error processing.

Then, the carriage drive motor 13 is driven to move the carriage 4 responding to a control signal from the CPU 21, and while the image scanner 9 is scanning in the transverse direction of the manuscript, the luminous elements 11 irradiate the light on the manuscript, the image sensor unit 12 receives the reflected light from the manuscript to read the image information in the transverse direction of the manuscript, and the image information is stored in the RAM 23 through the CPU 21.

Then, the carrier roller 17 is driven to move the manuscript holder 29 by a certain distance, again while the carriage 4 is being traveled, the image scanner 9 reads the image information of the manuscript, and the image information is stored in the RAM 23. This set of operations is repeated to read the image information of the entire manuscript, the image information is stored in the RAM 23, and the manuscript holder 29 is discharged, thus, reading operation of image information on the manuscript is completed.

After the completion of the reading operation, a recording medium is placed in the paper feeding unit, and the recording medium position on the selection switch is selected, the carrier roller 17 is driven rotatably responding to a control signal from the CPU 21, thereby, the recording medium, which is fed between the carrier roller 17 and the pressure rollers 18 from the paper feeding unit, is fed between the thermal head 5 and the platen 2.

When the recording medium is fed, the image scanner 9 is driven to read the top of the recording medium, and if the image scanner 9 reads nothing, the controller recognizes that the recording medium is fed correctly, then the operation is changed to a printing operation on the recording medium. If the image scanner 9 recognizes the identification marker 34, the controller recognizes that the recording medium is fed incorrectly, and the CPU 21 exercises an error processing.

After the judgment, in the condition that the thermal head 5 is pressed on the platen 2, the carriage drive motor 13 is driven responding to a control signal form the CPU 21 to move the carriage 4, and while the winding up bobbin 7 is driven rotatably to take up an ink ribbon, heating elements of the thermal head 5 is heated selectively based on the image information of the manuscript stored in the memory device to print desired information on the prescribed recording medium.

Therefore, in this embodiment, the image scanner 9 reads the identification marker 34 after feeding operation, and when the image scanner reads the identification marker 34, the controller judges that the medium fed in is a manuscript, then the image scanner 9 is operated to exercise reading operation of the manuscript, on the other hand, when the image scanner can not find the identification marker 34, the controller judges that the medium fed in is a recording medium, then the thermal head 5 is driven to exercise a printing operation on the recording medium, and in the event that the manuscript position is selected on the selection switch and a recording medium is fed instead of the manuscript holder 29, the controller exercises an error processing, therefore, the medium fed in is recognized and a reading operation of a manuscript and a printing operation on a recording medium are exercised consistently, thus, the convenience is improved.

In the embodiment described herein above, a recording medium has no identification marker 34, but a recording medium may have an identification maker 34 different from that of the manuscript holder 29, and the identification marker 34 of a recording medium and the identification marker 34 of a manuscript holder are read and the manuscript and the recording medium may be identified.

In the embodiment described herein above, the embodiment using a thermal transfer printer as the dot printer is described, however, the present invention may be applied to various dot printers such as wire dot printers and ink jet printers.

The present invention is by no means limited to the embodiment described hereinbefore, and various changes and modifications are applied as required.

What is claimed is:

1. A dot printer provided with:

a carriage provided facing to a platen and for traveling reciprocatively along the platen;

a recording head and an image scanner mounted on said carriage; and a feeding mechanism for feeding a desired manuscript or recording medium between said platen, and said recording head and said image scanner, for reading a manuscript image by said image scanner and for recording on said recording medium by operating said recording head based on the read image information, wherein an identification marker is formed on the upstream side of feeding of said manuscript, and a controller is provided to control the operation so that the identification marker is read by said image scanner to recognize that the medium fed in by said feeding mechanism is a manuscript, then, said image scanner starts to read said manuscript.

2. A dot printer provided with:

a carriage provided facing to a platen and for traveling reciprocatively along the platen;

a recording head and an image scanner mounted on said carriage;

a feeding mechanism for feeding a desired manuscript or recording medium between said platen, and said recording head and the image scanner; and a selecting means for selecting if the medium fed from said feeding mechanism is a manuscript or a recording medium, for reading a manuscript image by said image scanner and for recording on said recording medium by operating said recording head based on the read image information, wherein an identification marker is formed on the upstream side of feeding of said manuscript, and a controller is provided for controlling the operation so that when the manuscript is selected by said selecting means, the identification marker is read by said image scanner to recognize that the medium fed in by said feeding mechanism is a manuscript, then, said image scanner starts to read said manuscript, on the other hand, if said identification marker is not read, said controller exercises an error processing.

3. A dot printer as claimed in claim 2, wherein if a recording medium is selected on said selecting means and said image scanner recognizes that the identification marker is a manuscript, said controller exercises an error processing.

* * * * *